US008793692B2

(12) United States Patent
Tebbs

(10) Patent No.: US 8,793,692 B2
(45) Date of Patent: Jul. 29, 2014

(54) LANGUAGE FOR TASK-BASED PARALLEL PROGRAMMING

(75) Inventor: Duncan Tebbs, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 191 days.

(21) Appl. No.: 13/284,035

(22) Filed: Oct. 28, 2011

(65) Prior Publication Data

US 2012/0151496 A1 Jun. 14, 2012

(30) Foreign Application Priority Data

Dec. 14, 2010 (JP) ................................. 2010-277812

(51) Int. Cl.
*G06F 9/46* (2006.01)

(52) U.S. Cl.
USPC ............ 718/100; 718/102; 718/104; 718/106

(58) Field of Classification Search
None
See application file for complete search history.

(56) References Cited

U.S. PATENT DOCUMENTS

| 6,195,590 B1 * | 2/2001 | Powell ............................ 700/36 |
| 6,988,139 B1 * | 1/2006 | Jervis et al. .................... 709/226 |
| 7,467,383 B2 * | 12/2008 | Inchingolo et al. ........... 718/104 |
| 2005/0210473 A1 | 9/2005 | Inchingolo et al. |
| 2010/0274549 A1 * | 10/2010 | Tal et al. ......................... 703/17 |
| 2010/0299499 A1 * | 11/2010 | Golla et al. .................... 712/206 |
| 2011/0023044 A1 * | 1/2011 | Krutyolkin et al. ........... 718/102 |
| 2011/0107345 A1 * | 5/2011 | Al-Kadi et al. ............... 718/106 |
| 2011/0112832 A1 * | 5/2011 | Prorock et al. ................ 704/235 |
| 2011/0276966 A1 * | 11/2011 | Christensen et al. ......... 718/100 |
| 2011/0321051 A1 * | 12/2011 | Rastogi ......................... 718/102 |

FOREIGN PATENT DOCUMENTS

JP      2009-70264      4/2009

OTHER PUBLICATIONS

Frigo et al., "The Implementation of the Cilk-5 Multithreaded Language", Proceedings of the ACM SIGPLAN '98 Conference on Programming Language Design and Implementation, Jun. 1998.
Search report from EP, mail date is Apr. 29, 2013.
Japan Office Action in correspondence JP application No. 2010-277812, mail date is Apr. 8, 2014.

* cited by examiner

*Primary Examiner* — Charles Swift
(74) *Attorney, Agent, or Firm* — Greenblum & Bernstein, P.L.C.

(57) ABSTRACT

It is an object of the present invention to provide a program that can simply input dependency of tasks.
The first aspect of the invention relates to a program, especially relates to a higher level language. The program requires only inputs regarding tasks and dependency. Then the program may decide all tasks and dependency such that it can schedule all of the tasks with error-free. After all the tasks are scheduled using the dependency determined using the program of the invention. Each task may be executed by means of other programs or hardware.

4 Claims, 1 Drawing Sheet

LANGUAGE FOR TASK-BASED PARALLEL PROGRAMMING

TECHNICAL FIELD

The present invention relates to a language for task-based Parallel Programming. In particular, the present invention is directed to a system or software that can consider dependency of various tasks in computer, especially for games or graphics.

BACKGROUND ART

There are several libraries and frameworks that expose task parallelism, many including scheduling features such as dependency and continuations. While the task-parallelism paradigm is known to be an effective and scalable approach to programming many-core hardware, there are several problems associated with using such libraries and frameworks in C++ and other imperative languages.

Cilk [Frigo et al. 1998] is an extension of C/C++, adding keywords for task creation and synchronization, and including a sophisticated task scheduler. Tasks are specified as functions which can in turn spawn other tasks. Cilk greatly simplifies the creation of task-parallel programs, however the programmer must manually handle dependency by synchronizing with parent tasks (waiting for parent tasks to complete). Cilk++ is very tightly integrated with C++ (in fact it is a superset of the language), and as such it would be difficult to automatically calculate dependency information. References and pointers in C++ mean that the compiler and runtime system can make no assumptions about the data corresponding to the inputs and outputs of tasks.

PRIOR ART DOCUMENTS

Non Patent Document

[Non Patent Document 1]
FRIGO, M., LEISERSON, C. E., AND RANDALL, K. H. 1998. The implementation of the cilk-5 multithreaded language. Proceedings of the ACM SIGPLAN '98 Conference on Programming Language Design and Implementation (June).

SUMMARY OF THE INVENTION

Problem to be Solved by the Invention

It is an object of the present invention to provide a program that can simply input dependency of tasks. The program may be a higher language that only handles dependency of tasks and each task may be executed by lower languages.

It is an object of the present invention to provide a program that can automatically determine dependency of tasks.

It is another object of the present invention to provide a program that can attain parallel-task after automatically determining dependency of tasks.

Means for Solving the Problem

The first aspect of the invention relates to a program, especially relates to a higher level language. The program requires only inputs regarding tasks and dependency. Then the program may decide all tasks and dependency such that it can schedule all of the tasks with error-free. After all the tasks are scheduled using the dependency determined using the program of the invention. Each task may be executed by means of other programs or hardware.

The program of the present invention causes a computer to act as:
means for inputting a plurality of tasks;
means for inputting dependency of the tasks; and
means for automatically determining dependency of all of the inputted tasks by using the inputted dependency of the tasks.

The inputs required by the program are simple. However the program may make the computer automatically decide dependency of tasks without any errors. Repeatedly, after the program makes the computer decides dependency of tasks, other program may execute each task based on schedule decided using the dependency.

Example of the assignment statement is:

out_buffer:=my_task(in_buffer,param1).

In the above case, my_task requires output of "in_buffer" as an input as well as "param1", which may be a parameter or value used for the task. Thus my_task is decided to depend on "in_buffer". Then the task, "my_task" may be scheduled to be executed asynchronously with a dependency on any task that has "in_buffer" as an output.

A preferred embodiment of the program is that the dependency is input with a predetermined tag. In the above example, dependency is tagged with "buffer" and the dependent task is described within bracket.

A preferred embodiment of the program is that the tasks are executed in accordance with "task code" input, "input data buffer" input, "output data buffer" input and "immediate parameter" input. The dependency of the tasks are inputted as "input data buffer" input and "output data buffer" input, and the dependency of the tasks are determined by using "input data buffer" input and "output data buffer" input.

Because the dependency is input with a tag, buffer, the computer may determine input dependency by reading tagged information. The term "task code" may indicate each task that is executed by other program. The example of "task code" is animation which means to create animation for some object. The example of the immediate parameter is a number or value used for calculate something.

A preferred embodiment of the program is that it causes the computer to act as further having means for automatically scheduling tasks considering the determined dependency of all of the inputted tasks.

A preferred embodiment of the program is that the means for automatically determining dependency comprises: means for deciding a child task and one or plurality of parent tasks required for the child task; means for storing all of the parent tasks information; and means for deciding whether all of the parent tasks required for the child task are executed or not. The present invention includes computer readable media that contain the above referenced program. Further, the present invention includes a hardware, e.g., a computer, that implement the above referenced program.

Technical Effect of the Invention

The program of the present invention may simply determine dependency of tasks based on simple inputs of tasks and dependency thereof. Using the dependency, the computer that implement the program of the present invention may determine schedule of tasks. The program may be used as dependency controller.

BEST MODE FOR CARRYING OUT THE INVENTION

A Language for Task-Based Parallel Programming

Figure 1:
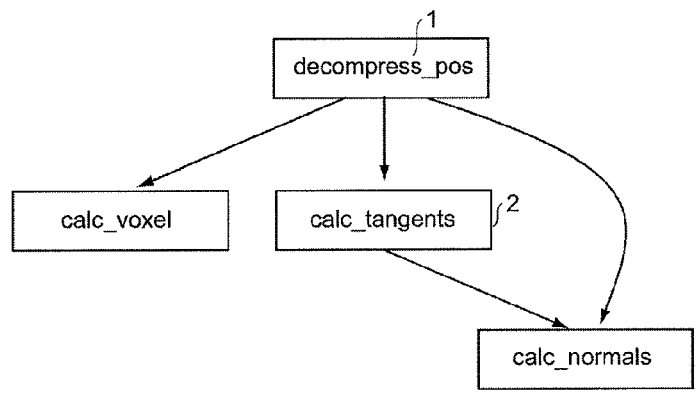
FIG. 1 depicts a dependency graph of Example 2.
Figure 2:
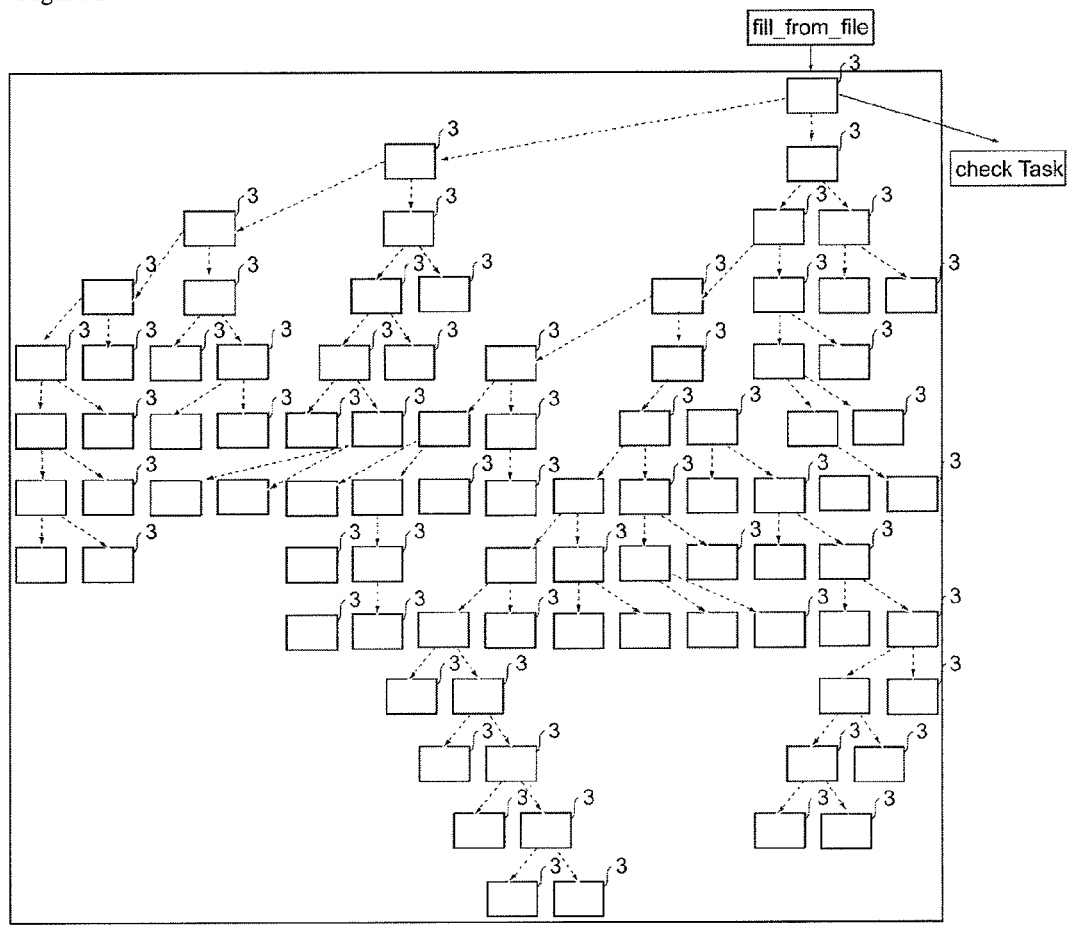
FIG. 2 depicts a dependency graph of Example 3.

We explain a language for task-based Parallel Programming of the present invention.

The framework resulting from the invention may be a two-tier system where the higher tier employs a small scheduling language for specifying tasks and dependency.

The lower tier corresponds to the implementation of tasks themselves, which can be either in the task language or, e.g., in C++, The program of the present invention is intended to direct to the higher tier program.

In programming of the higher tier, the specification of a task may consist of the following components: "task code", "input data buffer", "output data buffer" and "immediate parameter". Namely, a programmer may input information regarding "task code", "input data buffer", "output data buffer" or "immediate parameter" using pointing device such as key board, touch panel and a mouse. The programmer may input the dependency of tasks using "input data buffer" components and "output data buffer" components. In other words, the programmer shall only express a list of operations along with their input and output data requirements.

The programmer can write as follows:
Task 1: calculate character 1 position
Task 2: calculate character 2 position
Task 3: draw character 1 (when Task 1 is complete)
Task 4: draw character 2 (when Task 2 is complete)

In the above example, "calculate" and "draw" are "task code" and "when Task 1 is complete" and "when Task 2 is complete" correspond to "input data buffer". The input data are stored in memory of the computer. The computer automatically extracts dependency information to pass to a task scheduler. Namely, the system in which the program is implemented can automatically determine that task 3 depends on task 1 by reading the "input data buffer" and task 4 depends on task 2 by reading the "input data buffer". To determine the dependency, the computer may read the input from its memory and search brackets which indicate dependency. Then the computer determines all the dependency, task 3 depends on task 1 and task 4 depends on task 2.

The program may admit the programmer to input indication of sub-region of a larger buffer. The example of the notation of the input of sub-region is [and]. The indication may allow work on a single buffer to be divided up. When such data is input by the programmer, the computer stores the input at its memory. The computer then read the input from the memory and analyze the input and when the input is determined to contain [and], then the computer determined that sub-region task is indicated. Then the computer divides a single buffer into two or more.

The program may admit the programmer to input indication of bypass some of the restrictions on buffer use. The example of the notation of the input of bypass is Θ. The program may make the computer to automatically decide such a bypass considering the decided dependency.

The program or the computer with that program may decide a child task and one or plurality of parent tasks required for the child task. In the above example, task 3 depends on task 1 because to execute task 3 the result of task 1 is required. In this case, task 3 is a child task and task 1 is a parent task. The preferred embodiment of the invention stores all of the parent tasks information at its memory. The computer decides whether all of the parent tasks are finished or not using the parent tasks information stored at the memory. When the computer decides all of parent tasks are finished, then the computer may execute the child task. A programmer does not have to schedule of tasks and runtime because the program makes the computer automatically decide a child task and its parent tasks and execute the child task after all of the parent tasks are over.

The scheduler of the computer determines the execution order by considering all of the dependency of the tasks. The computer decides that character 1 and character 2 are independent. The computer decides that the tasks 1 and 3 and tasks 2 and 4 may be executed in parallel. The computer, using lower tier system, determines the runtime of each task.

In the system, the data may be tagged as buffers. The program may be stored in computer readable medium. The example of such a medium is CD-ROM, CD, DVD, FD, MO, USB memory, SD card, IP core, and IC chip. Namely, the present invention provides such a memory that stores above described program.

The second aspect of the invention is directed to a computer that comprises means for inputting a plurality of tasks; means for inputting dependency of the tasks; and means for automatically determining dependency of all of the inputted tasks by using the inputted dependency of the tasks. Namely, the computer stores the above program, e.g., at its main memory and determine dependency by means of operations provided by the program. The computer may include input means, output means, processing unit and computing unit. Each means and units are connected, e.g., by bus.

Example 1

As a simple example from an animation system, the code below schedules the unpacking of two animations and a blend task that operates on them, with the correct dependency.

```
buffer <Animation> anim1
anim1 :=unpackanim_task (input1)
buffer <Animation> anim2
anim2 :=unpackanim_task (input2)
buffer <Animation> final
final :=blend_task (anim1, anim2)
```

As described above, tasks and dependency are input. Namely, in the above example required information for each task is indicated within bracket. The required information relates to dependency. Thus when computer receives the above inputs, it decides tasks and dependency. The computer decides from buffer <Animation> final that the task requires anim1 and anim2 and thus the task depends on above two tasks.

Given the appropriately defined "Animation" data objects and required task code, the programmer needs only to specify how the data moves through the system. The runtime framework can then determine that the two "unpackanim_task" operations can be executed in parallel. The unpackanim and blend tasks can be written in C++ by implementing a function of the form:

```
void tl_blend_task(tlcontext_t tlctx,
        buffer_t       anim1,
```

-continued

```
buffer_t    anim2,
buffer_t    output1);
```

This implementation code will focus only on the calculations to be made without having to worry about the details of scheduling or locking the buffers. It will also depend only on a minimal set of code and data types, since all data must be passed in as function arguments.

We note here that although the type Animation is likely to be a C++ class, we intentionally do not give it an unpack ( ) method. Rather it is a data container, on which tasks, not methods operate. This architecture (in which methods provide data access and not operations) helps to reduce the dependency of computation functions (such dependency often cause problems when trying to re-factor existing code into tasks). This in turn allows much more parallelism to be introduced with minimal effort and fewer errors.

Example 2

The following shows a slightly more sophisticated example from a potential graphics application. Initially, position data is decompressed before being used for two purposes. Firstly the position data is used to fill a voxel structure for calculating detailed bounding shapes, and secondly positions are used to calculate tangent and normal data for lighting.

```
posBuf   :=  decomp_pos(compbuffer, numVerts)
tanBuf   :=  calc_tangents(posBuf, numVerts)
norBuf   :=  calc_normals(posBuf, tanBuf, numVerts)
voxelBuf :=  calc_voxel(posBuf, numVerts)
```

As described above, tasks and dependency are input. Namely, in the above example required information for each task is indicated within bracket. The computer determines all the tasks and dependency using the inputs. The task "tanBuf" depends on "posBuf", decomp_cos. The task "voxelBuf" depends on "posBuf", decomp_cos. The task "norBuf" depends on "posBuf", decomp_cos, and "tanBuf", calc_tangents. Then, the computer assign run time for all tasks or scheduling the tasks. Namely, the computer arrange to execute "decomp_pos" task at first, then it executes "calc_tangents" task and "calc_voxel" task in parallel, and then it executes "calc_normals" task.

The dependency graph below was generated by an instrumented runtime scheduler during execution of the code. It shows that the system correctly extracts the dependency between the tasks.

Example 3

This is a recursive sorting algorithm used as a more sophisticated test. Starting with a buffer of integers we choose a pivot (usually the right-most value) and do a fast pass over the buffer, re-arranging it so that the pivot is at the correct location, all entries to the left of the pivot are less than or equal in value, and entries to the right of the pivot are all greater in value than the pivot.

At this stage, left and right sides are not sorted, but we can recursively apply the same algorithm to these sub-buffers which will eventually result in a fully sorted list of integers.

In this example the recursive "sort" task is implemented in the task language and makes use of a "doSort ( )" function (implemented in C) to perform the actual operations on the data. The code for the "sort" function is as follows:

```
task buffer<uint32_t> output ::
    sort(size_t entries,
         buffer<uint32_t> input)
    # Divide using the pivot
    size_t pivIdx
    pivIdx = doSort(entries, output)
    # Sort LEFT buffer
    if pivIdx > 1 then
        buffer lBuf = output[0, pivIdx]
        lBuf<- sort(pivIdx, lBuf)
    end
    # Sort RIGHT buffer
    if pivotIdx < entries - 2 then
        buffer rBuf    = output[pivIdx+1,entries]
        size_t rEntries = entries-pivIdx-1
        rBuf    <-   sort(rEntries, rBuf)
    end
end
```

This code illustrates several language features:

"sub-buffers"—The [and] notation is used to create a new buffer object that refers to a sub-region of a larger buffer. This mechanism allows work on a single buffer to be divided up while still allowing dependency to be tracked.

"in-place buffer assignments"—The ←notation is used to bypass some of the restrictions on buffer use. This is used here for performance reasons to avoid allocating intermediate buffers for each stage.

"continuations"—After launching the parent tasks for the left and right sub-buffers, the child sort task will terminate. Under normal circumstances any dependent tasks can then be executed, however the parent tasks may not have completed and therefore the buffer may not be fully sorted. To overcome this, the system launches the parent tasks as continuations so that dependent tasks may not run until all parent tasks have completed.

The diagram below shows the dependency graph generated by running the algorithm on some test data. Red nodes indicate the parent tasks that are dynamically generated by the sort process. In this case check Task is not scheduled until all sort tasks have completed.

INDUSTRIAL APPLICABILITY

The present invention may be used in a computer industry, especially in an amusement industry.

EXPLANATION OF ELEMENT NUMERAL

1 task
2 buffer
3 sort

The invention claimed is:

1. A non-transitory computer readable recording medium storing a program that causes a computer to perform:
    inputting a plurality of tasks;
    inputting a dependency of the tasks; and
    automatically determining the dependency of all of the input tasks by using the input dependency of the tasks,
    wherein the tasks are executed in accordance with "task code" input, "input data buffer" input, "output data buffer" input and "immediate parameter" input,
    the dependency of the tasks are input as "input data buffer" input and "output data buffer" input, and
    the dependency of the tasks are determined by using "input data buffer" input and "output data buffer" input, the "input data buffer" input includes a condition defining that a task of the plurality of tasks starts after an other task of the plurality of tasks is complete, the program further causes the computer to perform:

inputting "sub-buffer" to divide a single buffer into a plurality of sub-buffers;

upon determining dependency of the tasks, and when the "sub-buffer" is input, dividing the single buffer into the plurality of sub-buffers while dependency of the tasks is tracked;

inputting "in-place buffer assignments" to bypass a restriction on use of the single buffer, and upon determining the dependency of the tasks, and when the "in-place buffer assignments" is input, avoiding allocating intermediate buffers.

2. The non-transitory computer readable recording medium storing the program in accordance with claim 1, wherein the dependency is input with a predetermined tag.

3. The non-transitory computer readable recording medium storing the program in accordance with claim 1, wherein the program further causes the computer to perform:

automatically scheduling tasks considering the determined dependency of all of the input tasks.

4. The non-transitory computer readable recording medium storing the program in accordance with claim 1, wherein the automatically determining dependency comprises:

deciding a child task and at least one parent task required for the child task;

storing all of the at least one parent task information; and deciding whether or not all of the parent tasks required for the child task are executed.

* * * * *